Figure 3:
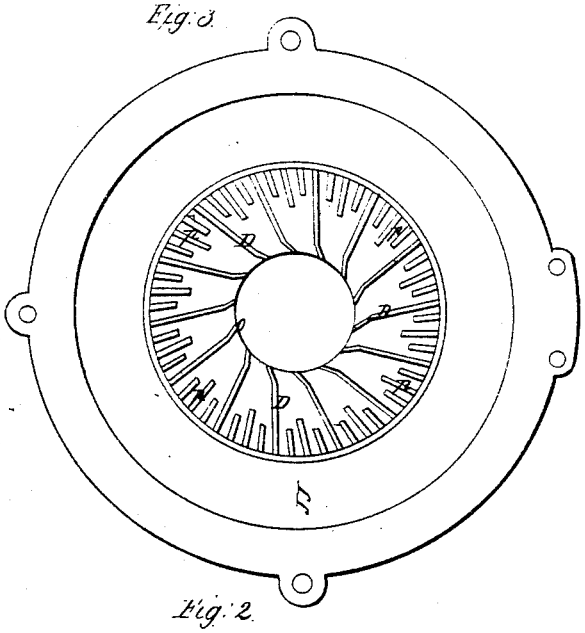
Figure 2:
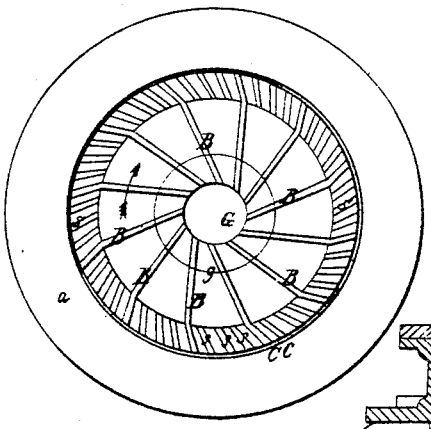
Figure 1:
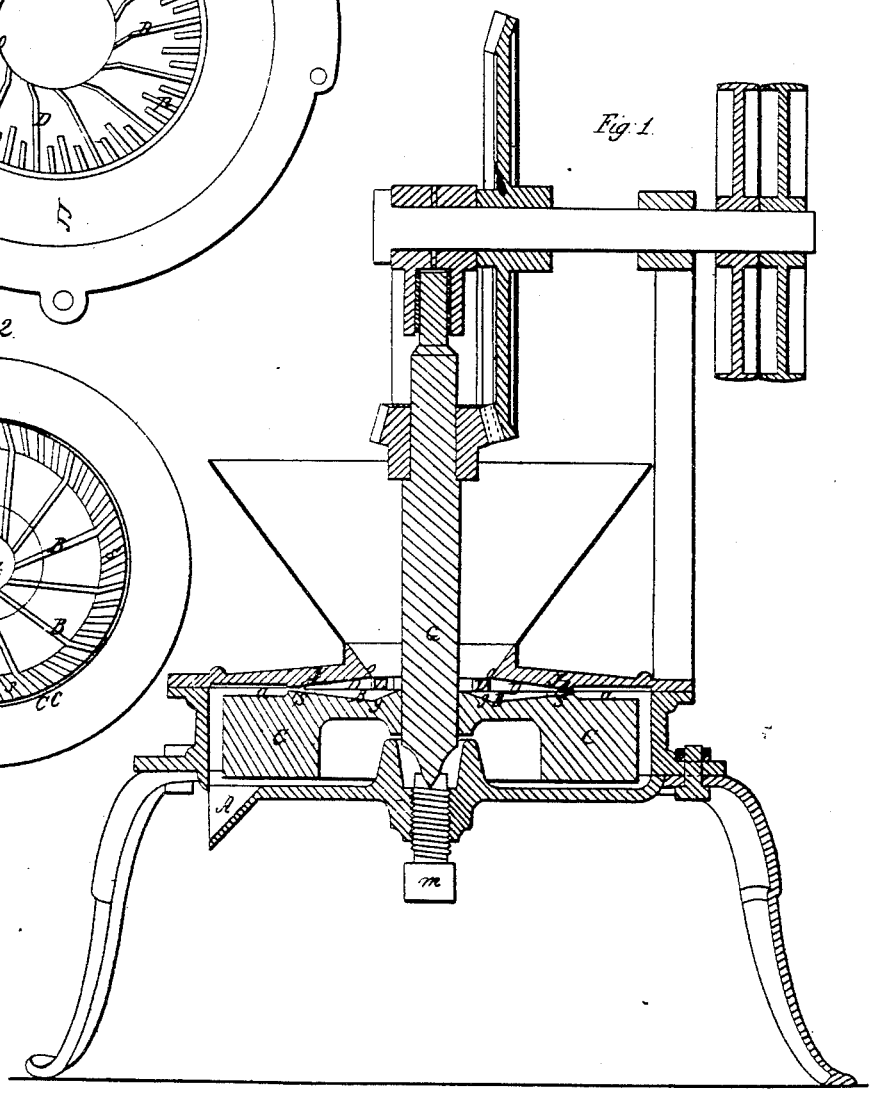

259

BEST AVAILABLE COPY

J. Burdge.

Grain Mill.

ADDITIONAL IMPROVEMENT

No. 193.

A. I. Patented Mar. 9, 1858.

H. PETERS, PHOTO-LITHOGRAPHER, WASHINGTON, D. C.

BEST AVAILABLE COPY

No. 193, to original Letters Patent No. 15,060.—*For improvement in Cutting Flour Mill.*—I claim the doubly conical concavity in, and cutting ridges on, the face of the cutter-head, arranged and acting as described, in combination with the concavity and ridges of the counter plate, for the purpose specified.

I also claim extending the ridges B B inward beneath the feeding aperture of the counter-plate, in combination with the inner conical concavity of the cutter-head and with the counter-plate, substantially as and for the purpose herein set forth.

JONATHAN BURDGE.